(12) United States Patent
Reial et al.

(10) Patent No.: US 10,231,213 B2
(45) Date of Patent: Mar. 12, 2019

(54) METHODS AND DEVICES FOR INCLUSION OF DATA IN PAGING MESSAGES

(71) Applicant: Telefonaktiebolaget LM Ericsson (publ), Stockholm (SE)

(72) Inventors: Andres Reial, Malmo (SE); Jose Luis Pradas, Stockholm (SE); Johan Rune, Lidingo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/570,281

(22) PCT Filed: Jul. 12, 2016

(86) PCT No.: PCT/EP2016/066546
§ 371 (c)(1),
(2) Date: Oct. 27, 2017

(87) PCT Pub. No.: WO2018/010769
PCT Pub. Date: Jan. 18, 2018

(65) Prior Publication Data
US 2018/0234944 A1   Aug. 16, 2018

(51) Int. Cl.
*H04W 68/00* (2009.01)
*H04W 68/06* (2009.01)

(52) U.S. Cl.
CPC .......... *H04W 68/06* (2013.01); *H04W 68/00* (2013.01)

(58) Field of Classification Search
CPC ... H04W 68/00; H04W 68/005; H04W 68/02; H04L 29/06027
See application file for complete search history.

(56) References Cited

U.S. PATENT DOCUMENTS

| 5,625,629 A | 4/1997 | Wenk |
| 5,729,540 A | 3/1998 | Wegrzyn |

(Continued)

FOREIGN PATENT DOCUMENTS

| EP | 0951192 A1 | 10/1999 |
| EP | 2348759 A1 | 7/2011 |

(Continued)

OTHER PUBLICATIONS

Non-Final Office Action dated Mar. 30, 2018 in connection with U.S. Appl. No. 15/322,100, 18 pages.

(Continued)

*Primary Examiner* — Diane D Mizrahi
(74) *Attorney, Agent, or Firm* — Leffler Intellectual Property Law, PLLC

(57) ABSTRACT

The disclosure relates to methods, devices, and computer programs in mobile communications. More specifically, the disclosure relates to a method, performed in a network node, for transmitting data to a wireless device. The method comprises obtaining a paging area for transmitting paging data to the wireless device, the paging area comprising multiple transmission points. The method further comprises selecting a subset of the multiple transmission points, based on a selection criterion, and initiating transmission of a paging transmission in the paging area. The paging transmission comprises first data and second data targeting the wireless device when transmitted from the transmission points of the selected subset of the multiple transmission points. The first data comprises the paging data and the second data comprises information not comprised in the first data. Moreover, the paging transmission comprises only the first data when transmitted from other transmission points of the paging area.

27 Claims, 5 Drawing Sheets

(56) References Cited

U.S. PATENT DOCUMENTS

| | | |
|---|---|---|
| 9,131,464 B2 | 9/2015 | Montojo et al. |
| 2008/0182596 A1 | 7/2008 | Wang et al. |
| 2009/0143072 A1 | 6/2009 | Montojo et al. |
| 2011/0051668 A1 | 3/2011 | Lee et al. |
| 2012/0172064 A1 | 7/2012 | Willey |
| 2012/0282956 A1 | 11/2012 | Kim et al. |
| 2015/0215474 A1* | 7/2015 | Thompson ........ H04L 29/06027 379/93.01 |
| 2017/0064625 A1* | 3/2017 | Sampath ........... H04W 52/0216 |

FOREIGN PATENT DOCUMENTS

| | | |
|---|---|---|
| EP | 2503833 A1 | 9/2012 |
| WO | 2013016862 A1 | 2/2013 |
| WO | 2016007847 A2 | 1/2016 |

OTHER PUBLICATIONS

PCT International Search Report, dated Mar. 9, 2017, in connection with International Application No. PCT/EP2016/066546, all pages.

PCT Written Opinion, dated Mar. 9, 2017, in connection with International Application No. PCT/EP2016/066546, all pages.

Kyocera, Initial Consideration of Paging Enhancements for Light Connection, 3GPP TSG-RAN WG2 #93bis, R2-162717, Dubrovnik, Croatia, Apr. 11-15, 2016, 3 pages.

Miloud Bagaa et al., Efficient Tracking Area Management Framework for 5G Networks, IEEE Transactions on Wireless Communications, vol. 15, No. 6, Jun. 2016, pp. 4117-4131.

Patrick Marsch et al., White Paper Preliminary Views and Initial Considerations on 5G RAN Architecture and Functional Design, Mar. 8, 2016, pp. 1-27.

Ming-Hung Tao et al., Location-Based Paging Mechanism in 16m, IEEE C802.16m-08/579r1, iEEE 802.16 Broadband Wireless Access Working Group, Jul. 7, 2008, 5 pages.

PCT International Search Report, dated Dec. 9, 2016, in connection with International Application No. PCT/EP2016/061130, all pages.

PCT Written Opinion, dated Dec. 9, 2016, in connection with International Application No. PCT/EP2016/061130, all pages.

Final Office Action dated Aug. 6, 2018 in connection with U.S. Appl. No. 15/322,100, 19 pages.

* cited by examiner

METHODS AND DEVICES FOR INCLUSION OF DATA IN PAGING MESSAGES

TECHNICAL FIELD

The present disclosure relates to mobile communications. More specifically, the proposed technique relates to methods for providing flexible configuration of paging signals. The disclosure also relates to corresponding devices and computer programs for executing the proposed methods.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, or an access point/node is a general term for a radio network node capable of transmitting radio signals to a wireless device and receiving signals transmitted by a wireless device. In Wireless Local Area Network, WLAN, systems the wireless device is also denoted as a Station, STA.

In the 5th generation mobile networks, also referred to as 5G, there will be evolution of the current LTE system. The main task of 5G is to improve throughput and capacity compared to LTE. This is achieved by increasing the sample rate and bandwidth per carrier. 5G is also focusing on the use of higher carrier frequencies, i.e. above 5-10 GHz.

In 5G, development takes one step further by connecting not only individuals but also all sorts of machines in real time. The Machine Type Communication, MTC, system should in particular allow for radio resource management that allows the coexistence between different classes of applications with operating characteristics such as; sporadic data, e.g., alert messages, periodic data, and others with e.g. real-time data (or simply best-effort data). These different types of applications have different requirements on the 5G network.

In view of Machine Type Communication, MTC, one requirement of the radio concepts to be used in 5G is to support low power devices. In a foreseeable future, billions of devices are expected to be connected through wireless networks generating the so called Internet of Things, IoT. Many of these are simple sensor devices that typically transmit small amounts of data seldom. One parameter that is vital for the enablement and success of IoT is power consumption. Ten years' longevity is a timeframe adopted by industry, which requires great resource frugality both in the communications modules as in the sensor or actuator modules of the device.

One further requirement on the radio concepts to be used in 5G is to support highly reliable ultra-low delay Machine-Type Communication, MTC, i.e., Critical-MTC. The Critical-MTC concept should address the design trade-offs regarding e.g., end-to-end latency, transmission reliability, system capacity and deployment, and provide solutions for how to design a wireless network for different industrial-application use cases. The Critical MTC system should in particular allow for radio resource management that allows the coexistence between different classes of applications: sporadic data, e.g., alert messages, periodic data, and others with e.g. real-time data (or simply best-effort data).

In cellular communication systems such as LTE, paging messages are used to page wireless devices being in idle mode about e.g. mobile terminated calls, i.e., to the wireless device incoming calls or data transmissions. Hence, paging is an important feature in idle mode operation. A paging message can also be used as a trigger for a wireless device to read system-information or to provide an indication from a public warning system.

In LTE, any data transmission succeeding the paging generally requires the wireless device to move from Idle Mode to Connected Mode, which results in a relatively large amount of signalling being exchanged between the wireless device and the network.

The currently proposed 5G specifications should allow adaptation of the present paging mechanisms to support certain special scenarios. This adaptation consists e.g. of repetition of paging messages for the purpose of coverage extension for low complexity/cost Machine Type Communication, MTC, devices or robustness improvement for wireless devices with extra-long Discontinuous Reception, DRX, cycles.

However, considering the diversity in terms of supported services, wireless device types, as well as deployments and use cases for 5G networks, further mechanisms aiming at defining communications mechanisms that enable optimizing network performance, despite the different requirements of the different types of applications and devices, are desirable.

SUMMARY

In the present disclosure, a method, a network node and a computer program are presented that provide for communication mechanisms that enable optimization of the performance of a communication network.

According to aspects of the present disclosure a method, performed in a network node, for transmitting data to a wireless device, comprises obtaining a paging area for transmitting paging data to the wireless device, wherein the paging area comprises multiple transmission points. The method further comprises selecting a subset of the multiple transmission points of the paging area, based on a selection criterion. Moreover, the method comprises initiating transmission of a paging transmission in the paging area. The paging transmission comprises first data and second data targeting the wireless device when transmitted from the transmission points of the selected subset of the multiple transmission points. Moreover, the first data comprises the paging data and the second data comprises information not comprised in the first data. Furthermore, the paging transmission comprises only the first data when transmitted from other transmission points of the paging area. The proposed methods provide an improved paging solution for 5G networks that is diverse in terms of supported services and wireless device types, as well as deployments and use cases. The proposed methods provide for an efficient approach for using paging messages to deliver user data in an optimized manner. That is, the performance of the communication network is enhanced since the radio resource usage is decreased, as is potentially the interference in the network as whole as well.

According to other aspects regarding the method, the transmission of the paging transmission is brought about by the existence of the second data targeting the wireless device. Hence, small data transmissions can be performed with reduced latency and signaling.

According to some aspects, the method may further comprise the step of configuring the paging transmission such that the paging transmission comprises the first data and the second data targeting the wireless device when transmitted from the transmission points of the selected subset of the multiple transmission points. The step further comprises configuring the paging transmission such that the paging transmission comprises only the first data when transmitted from other transmission points of the paging area. It is thereby provided for a method where the paging transmission can comprise different amounts of data in different transmission points within a set of transmission points. Hence, with this solution the benefits of data inclusion in the paging message can be achieved with a minimum of radio resource waste. The broadcast (i.e. the paging) resources are used for user data only in areas where it is promising that the wireless device will be able to receive the paging transmission and thereby the user data. Hence, resource usage is reduced in other areas.

According to further aspects regarding the method, the second data comprises non-paging related data. Signaling data communicated back and forth between the network node and the wireless device, e.g. a Radio Resource Control establishment procedure, is reduced.

According to further aspects regarding the method, the selection criterion comprises a probability associated with at least one of the multiple transmission points that the wireless device will be able to receive the paging transmission transmitted from said selected subset of the multiple transmission points. Hence, it is provided for a method that single out areas or regions where it is most likely that the wireless device will hear the paging. Hence, the communication resources can be scaled according to the likelihood that the wireless device is able to receive the communication.

According to further aspects regarding the selection criterion of the method, the selection criterion comprises at least one of the following parameters: information about data transmissions to or from the wireless device, information about Random Access messages or Tracking RAN Area update messages received from the wireless device, mobility statistics, positioning prediction, wireless device capability information, subscription data and/or network load.

It is thereby provided for a high flexibility in the choice of parameters in order to find the likelihood that the wireless device is able to receive the paging transmission.

According to further aspects regarding the method, at least two of the multiple transmission points within the selected subset transmit paging transmissions comprising different types or amounts of the second data. Hence, the proposed methods enable conveying messages of varying sizes and types via broadcast mechanisms, minimizing latency.

According to further aspects regarding the method, the initiating transmission comprises transmitting the paging transmission using a paging transmission format wherein the paging transmission format comprises only a paging indicator comprising the first data or wherein the paging transmission format comprises the paging indicator comprising the first data and a pointer to one or more paging messages. Hence, the proposed methods enable conveying messages of varying formats. This provides for even further optimization of the network resources. Due to some aspects the paging indicator comprises the second data targeting the wireless device. According to even further aspects the one or more paging messages comprise the second data targeting the wireless device. By letting the network node select an appropriate paging transmission format for a given paging message; the network performance is potentially optimized.

According to further aspects regarding the method, at least two of the multiple transmission points within the selected subset utilize different paging transmission formats. Selecting the appropriate transmission format for the given paging transmission allows for optimizing wireless device performance e.g. by enabling adaptations to link conditions and allowing for paging detection with simple receiver structure and/or low energy consumption.

According to some aspects the disclosure proposes a computer program comprising computer program code which, when executed, causes a network node to execute the methods described above. Thus, there is provided herein computer programs, comprising computer readable code which, when run on an apparatus, causes the apparatus to perform any of the methods disclosed herein. The computer programs of the network node display advantages corresponding to the advantages already described in relation to the respective methods disclosed above.

According to some aspects the disclosure proposes a network node, in a communication system, wherein the network node is configured for transmitting data to a wireless device. The network node comprises a radio communication interface configured for communication with the wireless devices. The network node further comprises processing circuitry configured to cause the network node to obtain a paging area for transmitting paging data to the wireless device, wherein the paging area comprises multiple transmission points. The processing circuitry is further configured to select a subset of the multiple transmission points of the paging area, based on a selection criterion. Moreover, the processing circuitry is configured to initiate transmission of a paging transmission in the paging area, wherein the paging transmission comprises first data and second data targeting the wireless device when transmitted from the transmission points of the selected subset of the multiple transmission points. Furthermore, the first data comprises the paging data and the second data comprises information not comprised in the first data. Moreover, the paging transmission comprises only the first data when transmitted from other transmission points of the paging area. Thus, there is provided herein a network node configured for transmitting data to a wireless device. Specifically, the network node is configured to transmit paging data. The same advantages and benefits are obtained as for the corresponding features and steps of the previously discussed computer program and method, respectively.

According to further aspects the the network node is a radio access node configured to transmit data from at least one of the multiple transmission points. According to even further aspects, the network node is a control node configured to control transmissions of paging data from at least one radio access node. The present disclosure thereby permits the network node to be configured in different ways providing for a more flexible communication network.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
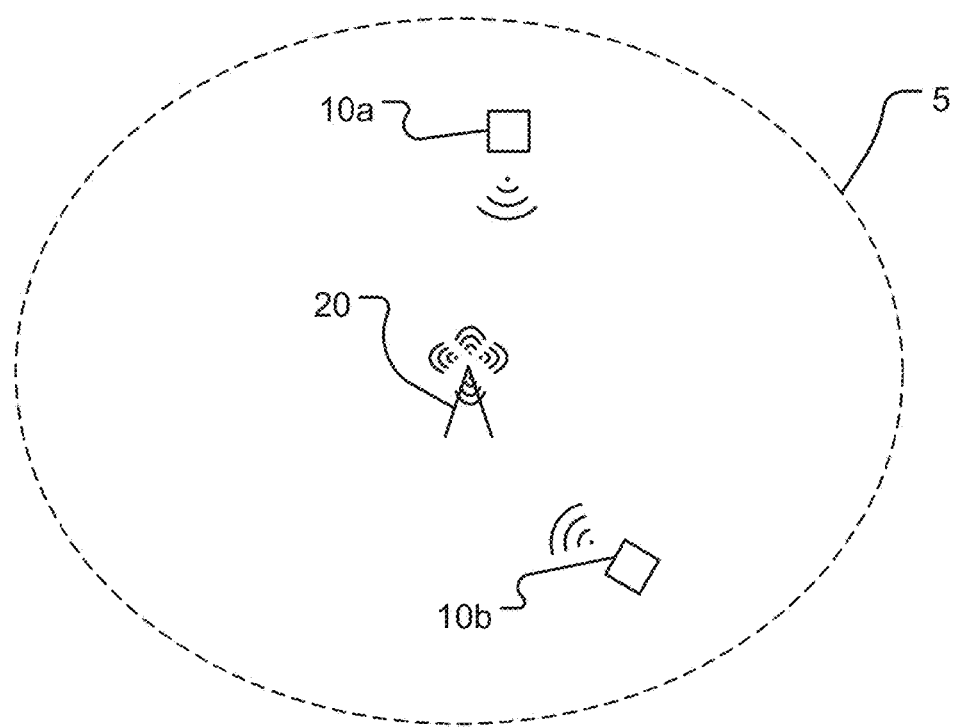
FIG. 1 is a schematic overview of a wireless communication system.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise. Moreover, the term "associating" may cover all manners of encapsulation, attaching, inclusion, concatenation, pointer, reference, chain of pointers, chain of references etc.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

A "wireless communication device", a "wireless device" or a "UE" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system, GPS, receiver; a personal communications system, PCS, user equipment that may combine a cellular radiotelephone with data processing; a personal digital assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

The terms access point, access node, network node, radio node or radio network node or eNodeB are used interchangeably throughout the text in the example embodiment description. The term transmission point may also refer to an access node, having only one point of transmission.

The access node is the uttermost node before the communication is broadcasted, i.e. it is the entity comprising an antenna. That is, in the case a transmitting antenna is integrated in a base station, the base station can be denoted as access node. However, it can also be that a base station controls several distributed transmission points. Hence, in this case the transmission points can be denoted as access points as well.

The wireless device can be in dormant or idle mode. Different terminologies are used within different standards. Moreover, within these standards the specifications of how known the status and/or location of the wireless device in a dormant or an idle mode is to the eNodeB and the core network are slightly different. However, these differences are not to be seen as limiting to the scope of protection. The terms hereinafter only refer to a mode comprising the wireless device not transmitting or receiving user data, that is user plane data, hence data to serve the user (e.g. speech, SMS, Internet communication etc.) and data utilized by applications or other non-paging related control plane data, e.g. control data.

The described assumptions in upcoming paragraphs should not in any way be regarded as limiting to the scope of protection, since they are only made to facilitate a pedagogical explanation of the disclosure, i.e., the present disclosure may be utilized with parameters belonging to other standards, and other hardware implementations and/or combinations.

In some of the figures operations and modules are illustrated with a solid border or with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination. Moreover, all figures are illustrative which means that further devices, method steps modules can be incorporated without exceeding the scope of protection.

In the case where there are several similar entities, these are numbered by e.g. A-1, A-2, . . . A-p. Where the last letter, in this example "p" represents the highest integer number of the series. Hence, it is the total number of entities.

Some of the example embodiments presented herein are directed towards mechanisms aiming at defining communications mechanisms that enable optimizing network performance. As part of the development of the example embodiments presented herein, a problem will first be identified and discussed.

The presented methods, computer programs and devices disclose how to optimize network performance by selecting the amount of data included in a paging message depending on how likely it is that the wireless device will be able to receive it. That is, a paging message has more information included if transmitted to a position where the probability is high that the wireless device is present and can receive the message.

To facilitate the understanding of the proposed technique, aspects of wireless communications and especially paging are further discussed. This discussion uses mostly terms from LTE, but similar concepts and principles are used also in other wireless communication standards.

A wireless communication system is illustrated in FIG. 1 which shows a cellular radio system 5. The system comprises wireless devices 10a, 10b (also denoted terminals, mobile stations, user equipment units, UEs), which communicate via a radio access network, RAN, with one or more core networks via a network node 20 (also denoted radio network node, base station, or Radio Base Station, RBS). That is, the network node is capable of transmitting radio signals to the wireless devices and receiving signals transmitted by the wireless devices. For example, the Universal Terrestrial Radio Access Network, UTRAN, is the radio access network of a UMTS and Evolved UTRAN, E-UTRAN, is the radio access network of an LTE system. In a UTRAN and an E-UTRAN, a User Equipment, UE i.e., a wireless device, is wirelessly connected to a Radio Base Station, RBS, commonly referred to as a NodeB, NB, in UMTS, and as an evolved NodeB, eNB or eNodeB, in LTE.

In LTE, "tracking" is a functionality which supports locating the wireless device and the tracking is controlled by the core network. The area covered by a network (supported by a core network) is broken down into Tracking Areas, TA, or other types of areas, depending on the wireless communication technology or standard. The core network configures and allocates a wireless device with one or more tracking areas. This allows the core network to locate the wireless device within a certain defined region. In LTE, the wireless device only remains connected to the core network when it is in idle mode; hence no connection with the base stations exists in this mode. That is, when the core network receives data targeting the wireless device, it initiates a paging which is then distributed from the base stations supporting the TA(s) allocated to the wireless device. When the wireless device enters one tracking area which is not in the tracking area list provided by the core network, the wireless device performs a tracking area update. This update assists the core network to update the wireless device location information.

In order for the network node to distribute user data to the wireless device the wireless device needs to be awake. In simplified terms, a typical aim of paging is waking up the idle wireless device if there is some data for it. For example, the purpose of paging in LTE is to transmit paging information to a wireless device in Radio Resource Control Idle, RCC_IDLE, state. It can also be to inform wireless devices in Radio Resource Control Idle, RCC_IDLE, state and wireless devices in Radio Resource Control Connected, RCC_CONNECTED, state about a system information change. The paging in LTE can also be utilized to inform about an Earthquake and Tsunami Warning System, ETWS, primary notification, an ETWS secondary notification and/or a Commercial Mobile Alert System, CMAS, notification. In other words, the paging message in LTE may include a paging record, which comprises one or more wireless device identities, the core network domain (e.g. packet switched, PS, or circuit switched, CS, in UMTS), different indications (e.g. system information modification, ETWS indication, CMAS indication) and Extended Access Barring, EAB, parameters modification indication.

In order for the wireless device to know when to wake up and listen for a paging it has to read paging information. In LTE paging information is provided in the so called System Information, SI, which is broadcasted in the LTE cells. More particularly in the System Information Block 2, SIB2, message. A paging cycle is defined in order to achieve an efficient paging procedure. This allows the wireless device to sleep most of the time. When the wireless device knows about the paging cycle, it will momentarily wake up during the onset of a paging cycle, i.e. the paging occasion, check if there is any paging for itself and if there is not, the wireless device goes back to sleep. If there is any paging for the wireless device then it will react to it, e.g. by triggering a Radio Resource Control, RRC, connection request message or, in case of a system information update indication, by receiving the system information.

In LTE, the format of the paging message is fixed, i.e., static. When the network sends a paging message to the wireless device, the network addresses it to the Paging Radio Network Temporary Identifier, P-RNTI, in the Physical Downlink Control Channel, PDCCH. All wireless devices with a paging occasion defined to the time of the paging will listen to the paging message. The PDCCH indicates the resource blocks allocated in the Physical Downlink Shared Channel, PDSCH, for the Paging Channel, PCH, where the paging message, e.g. a paging record, is contained. Hence, all wireless devices which decode the P-RNTI will acquire the paging message contained in the PDSCH, and not until after decoding the paging message will they realize if the paging is aimed for them or for another wireless device.

Moreover, if user data is waiting in the network to be transmitted to a specific wireless device, the paging message (paging record) includes the wireless device ID for which data is waiting. The wireless devices for which the user data is not targeted go back to idle/dormant mode after acquiring the paging message contained in the PDSCH. The wireless device for which the user data is intended starts a random access to get a Radio Resource Control, RCC, connection and to send a Non-Access Stratum, NAS, service request message to the core network. The wireless device therefore has to go through the whole RCC connection establishment procedure before it can transmit or receive any user data. When the wireless device is in Radio Resource Control Connected, RCC_CONNECTED, state, the network transmit the user plane data in the Physical Downlink Shared Channel, PDSCH.

Hence, this paging process results in a relatively large amount of signaling data being exchanged between the wireless device and the network. Moreover, all wireless devices listening to the paging need to acquire the paging message contained in the Physical Downlink Shared Channel, PDSCH, to find out if there is a message for them or if they can go back to sleep. The signaling load may be justified when there is a fair amount of user-data waiting to be delivered to the wireless device. However, the signaling load may be excessive when the amount of user data to be transmitted to the wireless device is limited and could be transmitted in a few resource blocks. This could for example be the case in mobile broadband and other applications or services (e.g. Machine Type Communication, MTC, applications and keep-alive messaging). In such communication, a large fraction of the data packets are small and could be transmitted in a very limited number of Transmission Time Intervals, TTIs, or resource blocks. When a wireless device is in idle mode or in a dormant state and when the network has user data to deliver, the network needs to send paging indications which reaches all wireless devices listening to the paging. Moreover, the targeted wireless device needs to start the random access procedure and establish a Radio Resource Control, RCC, Connection. This introduces a certain delay and a comparable amount of control signaling as user plane data, which is inefficient.

Different paging procedures are discussed with regard to the 5G system, i.e., in future cellular networks, paging may be performed using different signals. However, note that the 5G system is not yet standardized, so the description is based on concepts being presented and discussed by involved parties. For better understanding of the proposed technique some main concepts of the future 5G systems will now be briefly discussed.

In 5G, it is suggested that the "tracking" functionality which supports locating the wireless device is controlled by an access node or an access node with enhanced control function. This allows the access node to locate the wireless device within a certain defined region. Tracking RAN Areas, TRAs, (which is the term used in a non-published internal reference implementation of 5G) are established to define areas for paging. A TRA may consist of a large number of access nodes. From the view of the core network, a wireless device is viewed upon as connected/awake and it has always an established association with at least one access node, even though the wireless device is asleep. The wireless device is said to be connected_inactive (which is a term used in the in a non-published internal reference implementation) or dormant when sleeping. Each wireless device maintains an association with one or a list of the TRAs, and paging signals to that wireless device are transmitted within its respective Tracking RAN Area, TRA, or list of TRAs and to all wireless devices associated with those TRAs.

When the core network receives user data targeting the wireless device this data is distributed to the access node/s supporting the TRA/s to which the wireless device is associated. The paging is triggered in the access node. In the trivial case only one access node involved. However, it is also suggested that the paging message can be further distributed by the access node to other access nodes in order to reach several TRAs. Hence, during paging, all access nodes in the area (TRAs associated with the wireless device) transmit the paging messages and the wireless device may receive its paging from any of them.

Another alternative solution that might be implemented in 5G regarding the tracking functionality is a hybrid solution using a combination of the TRA and TA concepts. That is, the above mentioned 5G solution is mixed with the solution present in LTE. Hence, such a solution might imply that the user data is distributed to the access nodes by the core network. When an access node realizes that a receiving wireless device is not connected (i.e. that user data cannot be provided by the access node itself) it sends a request to the core network, requesting it to page the targeted wireless device in a specific area.

Yet another alternative is that the radio access network controlled dormant mode, with the associated radio access network controlled paging, and the core network controlled idle mode, with the associated core network controlled paging (i.e. the current LTE type of paging) exist in parallel.

Yet another alternative is that the core network controlled idle mode, with the associated core network controlled paging (i.e. the current LTE type of paging), is kept for 5G without the introduction of a radio access network controlled dormant mode with associated radio access network controlled paging.

Even though terms associated with one of these alternatives, e.g. the radio access network controlled dormant mode with associated radio access network controlled paging, is used more than other terms in the forthcoming description, this should not be seen as limiting the disclosure to this alternative. On the contrary, the disclosure can be applied to each of the above described alternatives and can be used both for radio access network controlled paging and core network controlled paging.

Within the discussions of the 5G concept, a paging mechanism has been discussed where the paging message transmission format can be adapted to efficiently serve multiple purposes; traditional paging to make a wireless device enter active mode, transmitting a small amount of user data to a wireless device without the wireless device entering the active mode, emergency message and other broadcast message distribution. The paging message format may for example consist of a paging indicator field allocated in a Paging Indicator Channel, PICH, indicating the targeted wireless device/s and one or several optional message field allocated in a Paging Message Channel, PMCH. Hence, it has been suggested a solution where small amounts of data are sent together with the paging.

The mechanism that has been discussed in relation to 5G to simplify the delivery of small amounts of downlink data is to attach the user data, together with the addressed wireless device ID, to the paging message. Hence, the user data (and not only the data relating to the paging) can be inserted in e.g. the paging indicator field or in an optional message field. Thus, the user data can be delivered to the wireless device without prior Radio Resource Control, RCC, connection establishment in cases where no further data transmission is required. The positive effects of including data in the paging message are that it reduces the control signaling and the latency of the downlink data reception for the targeted wireless device.

However, when the extended paging message, i.e., the paging message with included user data, is transmitted in a large number of access nodes/cells/areas. Hence, it will consequently be transmitted in many access nodes/cells/ areas where the targeted wireless device is not present, and thus cannot hear the paging. Such transmissions are redundant, increase the radio resource usage, potentially increase the interference in the network as a whole, and are quite wasteful.

That is, the included data increases the transmitted data volume in all the access nodes/cells/areas where the wireless device is paged, including those where the wireless device is not located. Moreover, several wireless devices, even located in areas far from the targeted wireless device have to listen to and receive the paging message.

The inventors have proposed an efficient approach for using paging messages to deliver user data. The main idea of the disclosed subject matter is a method in the network node/access node to decide whether to include user data in the paging message, based on reception probability at a specific location. Specifically, user data may be included in the paging message only in the transmission from one or more promising access node/s (cell/s, sector/s, area/s) that the wireless device is likely to hear, e.g. where the wireless device was recently observed, or where it was last known to be located. User data is not included in the paging messages transmitted from other access nodes.

Figure 2:
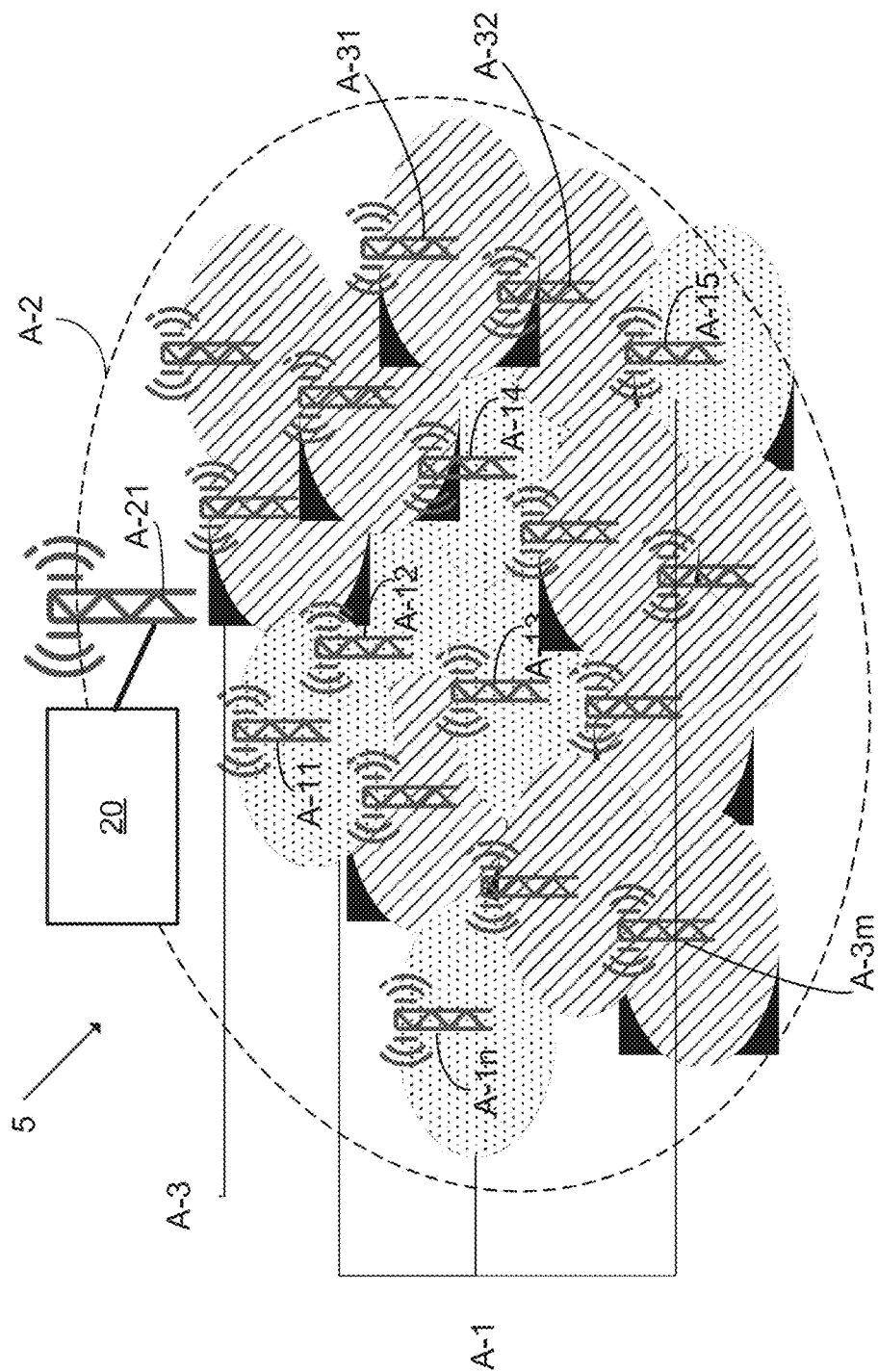
FIG. 2 depicts different tracking RAN areas in a communication system.
Figure 3:
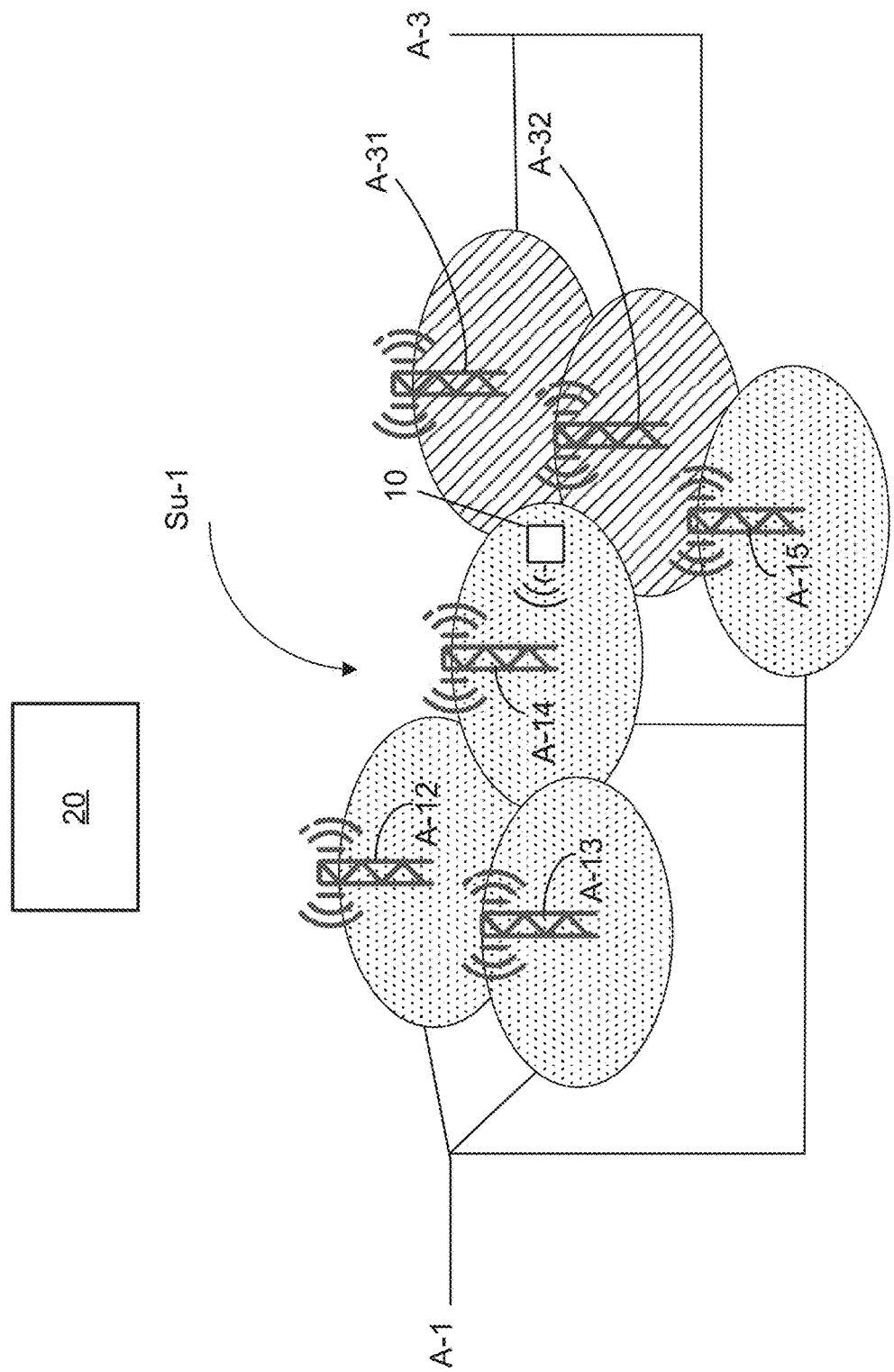
FIG. 3 illustrates a paging transmission in a selected subset of a tracking RAN area in the communication system of FIG. 2.

An example scenario where the proposed disclosure can be utilized is illustrated in FIGS. 2 and 3. The figures show a wireless communication system, i.e., a cellular radio system 5, as it might be configured in 5G. Present is a network node 20, several tracking RAN areas A-1, A-2, A-3, each one comprising several transmission points A11, A12, . . . , A1n, A21, A31, A32, . . . , A3m, and a targeting wireless device 10.

As mentioned earlier, the network node 20 can be an access node or a base station (cf. eNodeB in LTE) or any similar device's configured to achieve the same functionalities. Moreover, the wireless communication system is equipped with a paging mechanism wherein small amounts of downlink data, i.e. user data, can be attached to the paging message. In the example scenario, the network node 20 is informed that it needs to deliver a short downlink data package (e.g. user data) to a wireless device 10 which is in an energy saving state, i.e. a state in which the wireless device periodically monitors a set of downlink channels without having established an active link connection (dormant mode). A paging message with the enclosed user data is to be transmitted. It is assumed that the location of the wireless device is known to the network node in terms the tracking RAN area's (or tracking area, or similar area) associated with the wireless device. However, the exact closest/best transmission point of the wireless device is not known.

In this example, the transmission point A-21 and the network node 20 are integrated in a base station. The transmission point A-21 being associated with a tracking RAN area A-2 covering a large area, e.g. a macro-cell, whereas the other tracking RAN areas A-1, A-3 comprise several transmission points covering smaller areas, e.g. pico-cells. This example also shows that tracking RAN areas covered by different transmission points can overlap each other.

It is not resource efficient to send the paging message and the attached user data to all transmission points A11, A12, . . . , A1n, A21, A31, A32, . . . , A3m of all tracking RAN areas A-1, A-2, A-3, to which the wireless device is associated with. Instead, the inventors have proposed a method where it is possible to decide which transmission points that are most likely to successfully transmit the message to the wireless device. A paging message including the user data is transmitted from a subset Su-1 of transmission points consisting of these likely to be successful transmission point A-12, A-13, A-14, A-31, A-32. FIG. 3 illustrates the selected subset Su-1. However, to be sure that the message is received in case the device is not located near those transmission points, a regular paging message, i.e., a paging message just containing ordinary paging information, is transmitted from the rest of the transmission points. Hence, if the wireless device is not able to listen to one of the likely to be successful transmission points, it will probably be reached by a regular paging message and it can thereby start a random access procedure and establish a Radio Resource Control, RCC, Connection in order to receive the user data in a traditional way (c.f. the paging discussed in regard to LTE).

Example Operations in a Network Node

The proposed methods will now be described in more detail referring to FIG. 4.

Figure 4:
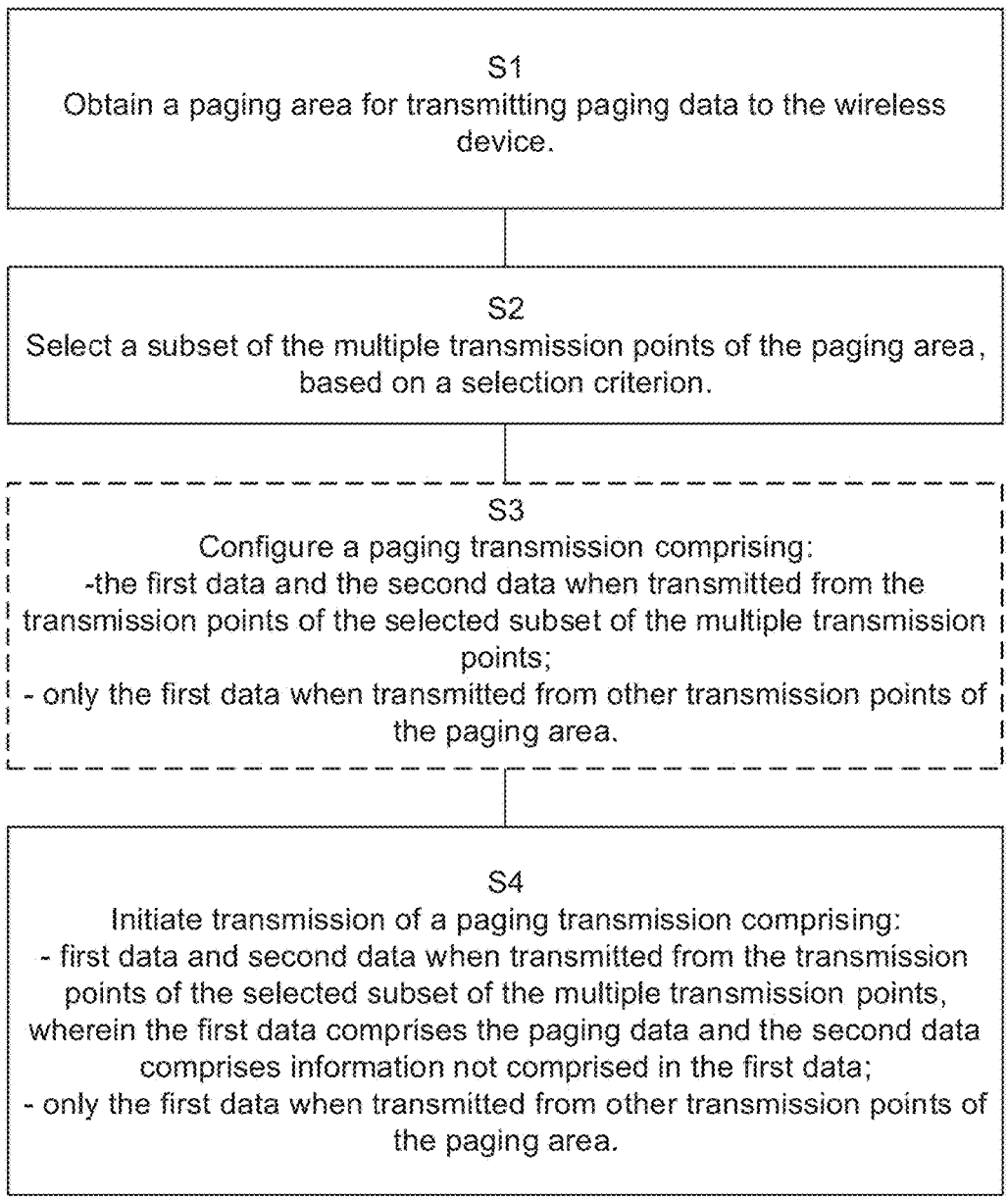
FIG. 4 is a flowchart illustrating method steps performed in a network node according some aspects of the proposed technique.

FIG. 4 illustrates a method, performed in a network node, for transmitting data to a wireless device. The method can be performed at any time, when a network node, for example in one of the network nodes in FIG. 2 or 3, has information that it wants to provide to one or several wireless devices.

The method comprises obtaining S1 a paging area for transmitting paging data, i.e., the paging record, to the wireless device, wherein the paging area comprises multiple transmission points. In other words the location where the paging message is to be sent is retrieved. Paging data here refers to paging information associated with the paging transmission, as discussed above. Hence, paging information is information that the network wants to provide to a wireless device using a paging transmission.

The paging area is the area or positions where the network wants the paging information to be distributed. According to some aspects, the paging area can, as previously discussed be divided into several tracking RAN areas, A-1, A-2, A-3, which are established to define areas for paging. A tracking RAN area may consist of a large number of transmission points. In this way, the transmission of a transmission point is expected to reach a specific tracking RAN area associated with that transmission point (cf. FIG. 2). A certain transmission point may also serve more than one tracking RAN area, e.g. for a transmission point which serves more than one cell or sector, different cells or sectors may belong to different tracking RAN areas. Transmission points associated with the tracking RAN areas of the paging area of a certain wireless device will thus be involved in the paging of this wireless device. Disregarding the fact that often proprietary "smart paging schemes" are used to initially page the UE in a subset of the paging area and page in the rest of the paging area only if no response is received from the UE. The transmission point is the point where the antenna transmitting the paging and associated information is located. Hence, the transmission point is associated with an antenna from where the paging message (and other communication) is transmitted. According to some aspects the transmission point is an access node or a remote antenna arrangement. Hence, an access node can be considered to be a transmission point but it can also be the case that an access node comprises several transmission points. This can for example be the case when a transmission point is associated with a specific directional antenna beam (can be steerable), or when the transmission point is associated to cover a specific sectoral area. That is, according to some aspects the transmission point is functional rather than physical, and could thus correspond to a sector or transmission beam.

According to some aspects, each wireless device maintains an association with one or a list of tracking RAN areas. The tracking RAN areas that the wireless device is associated with is the tracking RAN areas where the wireless device is to be paged, i.e. the paging area. This allows the network to locate the wireless device within a certain defined region, through paging in all the associated tracking RAN areas. When the wireless device enters one tracking RAN area, which is not in the list (i.e., the wireless device is not associated with that tracking RAN area) provided by the network, the wireless device performs a tracking RAN area update. This update assists the network to update the wireless device location information. According to some aspects, the wireless device will not perform a tracking RAN area update in this case, but rather a tracking area update to the core network or just silently switch to idle mode. Accordingly, in a system comprising tracking RAN areas, the obtaining S1 is, due to some aspects, based on a transmission points tracking RAN area allocation table available at a network coordinating node e.g. a network node that may perform coordination tasks over a given network neighborhood. The table is a list of transmission points in the tracking RAN area (or list of tracking RAN areas) currently configured for the wireless device and where the wireless device is to be paged.

The method further comprises selecting S2 a subset of the multiple transmission points of the paging area, based on a selection criterion. In other words, a number of transmission points, where the paging is to be transmitted, are singled out based on the selection criterion.

That the selecting is performed "based on" a selection criterion, implies that parameters, restrictions, and/or specifications associated with the selection criterion is considered in the selection. Hence, the selection criterion depends on these parameters, restrictions, and/or specifications.

According to some aspects the subset of the multiple transmission points might be empty. Hence, no "real" subset is selected. This might for example be the case when the wireless device has been in dormant mode for a very long time and the probability of finding it is equally low in all tracking RAN areas to which it is associated.

In one alternative, all transmission points of the paging area are comprised in the subset. The example could be the same as previously described, i.e., the wireless device has not been heard from in a long time and the likelihood for it to hear the paging is equally low in all tracking RAN areas to which it is associated. However, in this scenario the network is not heavily loaded, hence it has free resources to utilize. This option may also be used if the data to be delivered is particularly urgent.

In another alternative the selected subset is further divided more subsets. Hence, in this alternative, the selected transmission points are dived into subsets.

According to some aspects, the subset of the multiple transmission points are all selected from one tracking RAN area. Alternatively, the subset of the multiple transmission points are selected from at least two different tracking RAN areas. Hence, according to some aspects the choice of the subset is not based on which specific tracking RAN area a chosen transmission point belongs to, as long as the said tracking RAN area is associated with the wireless device.

According to further aspects, the selection criterion comprises a probability associated with at least one of the multiple transmission points that the wireless device will be able to receive the paging transmission transmitted from said selected subset of the multiple transmission points. Hence, the selection criterion gives likelihood for a specific transmission point that the pinpointed wireless device can be heard if paged by that specific transmission point. Hence, the selection criterion according to some aspects reflects for an anticipated probability that the wireless device will be able to receive a signal, i.e., the paging. This probability is given for one, several or all transmission points in the areas where the wireless device is to be paged.

According to some aspects, one, several, or all of the transmission points in the paging area is looked upon and evaluated based on the selection criterion. If the transmission point is among the most-likely-to-be-heard transmission points then it is contained in the selected subset.

Referring back to the example scenario, c.f. FIG. 3, a subset Su-1 has been formed, based on selection criterion, containing transmission points from the tracking RAN area A-1 and A-3. Based on parameters of the selection criterion the wireless device is most likely to be able to receive a signal from one of the transmission points in Su-1.

According to some aspects, the selection criterion comprises a threshold wherein transmission points with a probability to transmit successfully is higher than said threshold are considered to be the ones most-likely-to-be-heard, and thereby included in the subset.

Hence, it is provided for a method that single out areas or regions where it is most likely that the wireless device will hear the paging.

In other words, the subset of one or more transmission points in the tracking RAN Area or list of tracking RAN areas that the wireless device is most likely to hear, i.e., receive communication from, is determined. This means that the communication resources can be scaled according to the likelihood that the wireless device is able to receive the communication.

The selection criterion may further comprise at least one of the following parameters: information about data transmissions to or from the wireless device, information about Random Access messages or Tracking RAN Area update messages received from the wireless device, mobility statistics, positioning prediction, wireless device capability information, subscription data and/or network load.

The mobility statistics may comprise short term movement history statistics of the wireless device collected whether wireless device was in active/connected mode and/or when the wireless device was in dormant or idle mode, e.g. based on the locations of the wireless device at different communication events (such as transmission of user data or control data, e.g. in the form of tracking RAN area update). The mobility statistics may also comprise long term statistics of the movements of the wireless device, including e.g. the most frequently visited locations or transmission points or the locations or transmission points where the wireless device has spent the longest accumulated time. Furthermore, the mobility statistics may comprise mobility statistics that is not specific to the wireless device, but rather generic movement patterns identified as prevalent in the area. Such movement patterns may be caused e.g. by the presence of a railroad or a highway passing through the area, e.g. through the coverage areas of a set of transmission points (such that these coverage areas are typically traversed sequentially by wireless devices). Wireless device capability information is typically signaled from the wireless device to the network, e.g. in conjunction with the wireless device's initial attachment to the network, and in for support of the present invention the capability information may contain information that implies how mobile the wireless device may be expected to be, e.g. derived from the type of device or explicit indications of degree of mobility. The capability information may even indicate that the wireless device is stationary (but note that a stationary wireless device at the border between the coverage areas of two or more transmission point may still switch between the transmission points due to fluctuations in the radio environment). Subscription data may also include relevant information, such as if the wireless device is stationary.

It is hereby provided for a high flexibility in the choice of parameters to be used in the selection criterion in order to find the likelihood that the wireless device is able to receive the paging transmission from a specific transmission point. Based on this likelihood it is determined if the transmission point is to be included in the selected subset of multiple transmission points.

The choice of parameters to be comprised in the selection criterion is now to be discussed more thoroughly.

According to some aspects, the selection criterion can be based on information from the last time the wireless device received and/or transmitted signals. In this way the selection of the subset is based on recent data transmissions performed by the wireless device in the active mode. The last serving transmission point, and possibly transmission points in its vicinity, may be deemed most-likely-to-hear. The size of this combined area, e.g. the number of transmission points in the vicinity of the wireless device, may depend on how long time that has elapsed since the last indication of the wireless device's location was received. For example, if it was a long time ago since the wireless device was active, a large amount of transmission points are included in the chosen subset. On the other hand, if it was a short time since the mobile phone was in Radio Resource Control Connected, RCC, state, then a single or a few transmission points can be selected.

Furthermore, by letting the selection criterion rely on the transmitted signals from the wireless device one can be sure that wireless device actually received the last signal. Moreover, due to some aspects, the selection criterion can comprise information of the last time the wireless device received user plane data.

As stated, the selection criterion may also be based on properties of previously received Random Access messages, i.e. messages interchanged when the wireless device requests a connection setup. For example, in LTE the first step of a random-access procedure is the transmission of a random-access preamble (transmitted on the Physical Random-Access Channel, PRACH) from the wireless device. This is generally transmitted from the wireless device when it wants to inform the network of its desire to connect to the network i.e. establish a RRC connection. In Idle or dormant mode the wireless device sometimes starts up this random-access procedure without reaching a successful Radio Resource Control, RRC, connection. This can for example be for sync purposes or to read system information. From these random access messages the network knows in which transmission points and with which signal strength the wireless device was last heard. Hence, it can be utilized as parameters in the selection criterion.

In other words, the wireless device location information can be determined by random access transmission in the dormant/inactive mode and a full radio resource control, RRC, connection does not have to be established in order for the random access message to be used in the selection criterion. According to some aspects, the transmission points and possible neighboring transmission points where random access-procedure was last started are contained in the subset.

Another given alternative is to utilize tracking RAN area update messages received from the wireless device. As previously stated, when the wireless device enters one tracking RAN area which is not on the list of associated tracking RAN areas provided by the network, then the wireless device performs a tracking area update. In other words, the wireless device location information is based on receiving recent tracking area updates in the dormant/inactive mode. This option, i.e. these parameters, might for example be utilized by the selection criterion when it was a long time since the wireless device received user plane data.

In yet another alternative, the network may periodically request some or all wireless devices in the Tracking RAN Area to perform the Random-Access procedure, in order to determine the best serving transmission points. This is performed even if there are no other reasons for the wireless device to contact the network. The transmission point information may then be used for decisions about bundling data with paging, i.e., to be used to select which transmission point that are likely to succeed in their transmission to the wireless device. That is, the best receiving transmission point, and possibly transmission points in its vicinity, may be deemed most-likely-to-hear and thereby be selected by the selection criterion to be included in the subset.

Consistent responses from a wireless device, indicating the same transmission point, may also be used to deduce that the wireless device is in a static or semi-static state and the combined area (i.e. the subset consisting of preferred transmission points) may be gradually shrunk to a few or one single transmission point.

The approach where the network triggers a response from the wireless device does not necessary need to be performed periodically; it may also be triggered at specific occasions. For example when the wireless device has not been heard from in a long time.

According to some aspects, the selection of transmission points that are likely to be successful to transmit a signal to the wireless device might also be based on the velocity and/or direction of the wireless device the last time it was in a connected state, i.e., recent mobility updates performed by the wireless device in the active mode. Hence, the selection criterion uses at least these parameters to calculate the likely position of the wireless device at a later time.

The previous described selection criterion has been based on information of where the wireless device was last located, i.e., position pinpointing based on recent transmissions. However, the selection criterion can also be based on prediction of where it is likely that the wireless device will be positioned and able to receive a signal.

In one alternative, position prediction can be utilized. This can e.g. be the case when wireless device specific mobility statistics, e.g. statistics based on the latest observations of the wireless device's location or previously recorded long-term statistics for the wireless device, are utilized. For example, the selection criterion can comprise statistical handling of recent mobility updates performed by the wireless device in the active mode. A probability calculation may be performed deciding where it is likely that the wireless device is located. Hence, the transmission point/s included in the selected subset, i.e. the most-likely-to-hear transmission point/s, can also be selected based on long-term mobility statistics. Based on such statistics, the wireless device's last confirmed location and the time that has elapsed since the wireless device location was confirmed the wireless device's likely movements may be predicted and the transmission points selected as the most-likely-to-hear can be adapted accordingly.

According to further aspect, the selection criterion can be based on position prediction utilizing wireless device non-specific mobility statistics which identifies general wireless device movement patterns, e.g. following highways or railroads. This analysis might in one example be based on big data analysis, where large data sets containing e.g. the mobility of wireless devices, reanalyzed in order to detect patterns. That is, by using the knowledge of flows of a huge amount of wireless devices (the users), it can be predicted where it is likely that a specific wireless device will be located and hence corresponding transmission points can be selected where it is likely that the wireless device will hear a paging message at a certain time.

Furthermore, the selection criterion may also be based on parameters that do not relate directly to the wireless device, one example being the load of the network. The network load is e.g. the load of the transmission point or a node connected to the transmission point or a transport network connection to/from the transmission point or the node connected to the transmission point.

In particular load can be used to select a transmission point from multiple potential transmission points. Hence, the load that is relevant is load of the different transmission points that cover the paging area. For example, if one network node is heavily loaded it can decide that only one, i.e., the transmission point with the highest wireless device reception probability, is to be included in the subset.

Moreover, the selection criterion may also be based on the amount of second data that is targeting the wireless device. If for example a large amount of data is to be transmitted it might be more resource efficient to utilize conventional paging from all transmission points, e.g. as described in relation to LTE.

All these parameters, options, and alternatives provided for the selection criterion to be based on should be seen as examples and not limiting to the scope of protection. Moreover, the selection criterion presented can where it is applicable be used in combination.

The method further comprises initiating transmission S4 of a paging transmission in the paging area. In other words, the network node launches or starts up a transmission of paging information. If the network node comprises a transmission point this step implies that the transmission point transmit the paging information. If, the network node is associated with remote base stations or transmission points, this step implies that the network node instructs or requests the said base stations or transmission points to transmit the paging information.

The above mentioned paging transmission comprises first data and second data targeting the wireless device when transmitted from the transmission points of the selected subset of the multiple transmission points. Moreover, the first data comprises the paging data and the second data comprises information not comprised in the first data. In other words, small amounts of user data to a wireless device is transmitted in conjunction with paging of the wireless device from the transmission points in the selected subset. Stated differently, the user data (the second data) is included in the paging message transmitted from the most-likely-to-hear transmission point/s.

That is, the paging transmission transmitted from the transmission points in the selected subset has included user data, e.g. non-paging related control plane data or application data, in the paging transmission.

Differently stated, the paging transmission comprises paging data and other data targeting the wireless device when transmitted from the transmission points of the selected subset of the multiple transmission points.

According to some aspects, the first data only comprises control information relating to the paging transmission.

According to some aspects, the first data comprises one or more wireless device identities and one or more paging indications. That is, the data comprised in the first data is data that is associated with the paging. In LTE, the paging related data (c.f. the first data) may include a paging record, which comprises one or more wireless device identities, the core network domain, different paging indications (e.g. system information modification, Earthquake and Tsunami Warning System, ETWS, indication, Commercial Mobile Alert System, CMAS, indication) and/or Extended Access Barring, EAB, parameters modification indication.

Paging messages that include additional data targeting all transmission points or all wireless devices associated with these transmission points are in this context regarded as only paging data, i.e. first data.

The second data is according to some aspects payload data, i.e., the actual intended message/s to the wireless device. That is, user data specifically intended for a specific wireless device.

Hence, according to some aspects, the second data, i.e., the other data, comprises non-paging related data. In other words, the second data comprise other data than paging data. Other data is data that does not relate to paging and is targeting one or a few wireless devices. It can for example be user data, e.g. user plane data, relating to data that serve the user (e.g. speech, SMS, internet communication etc.) and data utilized by applications. It can also be non-paging related control plane data, e.g. control data.

One option is that the actual data is transmitted separately from the paging message (herein referred to as the paging indication), e.g. on other subcarriers (i.e. other frequencies). Then the second data is not the actual data but rather information indicating how to find the transmitted data (e.g. indications of the subcarriers used for the data transmission).

Hence, the disclosure comprises both this option and the option where the actual data is included in the actual paging message.

According to some aspects, paging formats are introduced. Then both the paging indication and the data could be considered being part of a "paging transmission". This is described in detail below. Stated differently, the disclosed subject matter proposes a method where the paging indicator is transmitted together with user data from selected transmission points. Hence, non-paging related data is transmitted directly, from the network, by likely to be successful transmission points, to the wireless device without any previous connection establishment. That is, when the wireless device is located where it can receive signals from one of the transmission points in the selected subset, then user data is directly transmitted.

The wireless device might for example directly extract a data packet with payload data when receiving a paging indicator and the page is addressed to the wireless device and the paging indicator indicates attached data. Thereby no Radio Resource Control, RRC, communication needs to be established.

In this way, the signaling data communicated back and forth between the network node and the wireless device, is minimized and these communication resources can be utilized in other ways.

According to some aspects, the transmission of a paging indicator together with user data entails transmitting a paging indicator containing an identifier of the targeted wireless device, an indication that user data follows, and an attached data packet.

Furthermore, the above mentioned paging transmission comprises only the first data when transmitted from other transmission points of the paging area. In other words, the paging transmission comprises only the paging data when transmitted from other transmission points of the paging area.

"Only the first data" is here to be understood as "at least of" or "substantially only". Hence, according to some aspects it is possible to comprise other data than paging related data in the first data. However, the amount of data comprised in the first data is smaller than the amount of data comprised in the second data.

In other words, regular paging messages are transmitted by the transmission points not selected to be in the selected subset of transmission point. That is, transmission points where it according to the selection criterion is not likely that that wireless device can receive the paging. This means that a wireless device positioned in a region of the paging area where it is not predicted to be stationed can still be reached by the paging message and a connection can be established. That is, the network transmits a paging indicator and the wireless device receives the paging indicator. If the page is addressed to the wireless device then the wireless device initiate control and user plane connection establishment. The network node then establishes a user plane connection and transmits data over user plane after which the wireless device receives the data over the user plane. All according to previously described paging solutions in e.g. LTE.

Referring back to the example scenario, c.f. FIGS. 2 and 3, only paging data is transmitted from the transmission points not comprised in the subset Su-1. This means, that the wireless device is able to receive the message intended for it in a conventional way from these transmission points.

According to some aspects, the transmission of the paging transmission is brought about by the existence of the second data targeting the wireless device. Stated differently, the paging transmission is triggered by the existence of the second data targeting the wireless device. In other words, the method is performed when other data, i.e. user data not related to the paging, is to be delivered to a wireless device.

According to some aspects, the method is performed when the amount of user data to be delivered is small in the sense that the overhead to establish an Radio Resource Control, RRC, connection is large compared to the user data that is to be delivered. According to some aspects, a parameter regarding the amount of user data to be sent is comprised in the selection criterion.

Hence, small data transmissions can be performed with reduced latency and signaling.

Moreover, the proposed methods provide for an efficient approach for using paging messages to deliver user data in an optimized manner, where transmission of small amounts of data to a wireless device is in conjunction with paging of the wireless device in a subset of one or more transmission points in the Tracking RAN Area, TRA, or list of TRAs that the wireless device is most likely to hear.

It is implied that, the performance of the communication network is enhanced since the radio resource usage is decreased, as is potentially the interference in the network as whole as well.

Furthermore, compared to solutions where user data is included in paging transmissions in the entire paging area, the paging can with the proposed solution be performed in a larger area without increasing the resources.

Another situation where resources are spared compared with a solution where user data is always included in the whole paging area is when most recent available location information is stale according to the selection criterion. Then the most-likely-to-hear transmission point subset may be defined as empty and data transmission is omitted in the entire paging area (e.g. Tracking RAN Area, TRA, or list of TRAs configured for the wireless device).

Furthermore, is hereby provided for a method where the paging transmission can comprise different amounts of data within a set of transmission points. Hence, with this solution the benefits of data inclusion in the paging message can be achieved with a minimum of radio resource waste. The broadcast (i.e. the paging) resources are used for user data only in areas where it is likely that the wireless device will be able to receive the paging transmission and thereby the user data. Hence, resource usage is minimized in other areas.

According to some aspects, the method may further comprise the step of configuring S3 the paging transmission such that the paging transmission comprises the first data and the second data targeting the wireless device when transmitted from the transmission points of the selected subset of the multiple transmission points.

By configuring, it is implied that the paging transmission is constructed, arranged or composed as described above. In other words data intended for the wireless device is associated to paging indicators transmitted in the one or more most-likely-to-hear transmission points.

According to some aspect, the step of configuring S3 the paging transmission such that data is attached comprises providing in the paging indicator a pointer to data resources and transmitting the data at these resources.

The configuring step S3 further comprises configuring the paging transmission such that the paging transmission comprises only the first data when transmitted from other transmission points of the paging area. In other words, user data is not included in the paging transmission transmitted from transmission points where it, according to the selection criterion, is less likely that the wireless device will be able to listen.

Paging Transmission, Different Types, Amounts or Formats

According to further aspects, at least two of the multiple transmission points within the selected subset transmit paging transmissions comprising different types or amounts of the second data. That is, the second data, i.e. the data comprising user data, can be configured to comprise one amount of user data when transmitted from at least one transmission point within the subset and another amount (smaller or larger) when transmitted from at least one other transmission point within the subset.

The different types of data may comprise short messaging-related data, connection keep-alive-related data, smartphone application related-data, status update-related data, etc. In general, the second data advantageously conveyed in conjunction with the paging message is any short downlink data that is not expected to be a part of a continuous transmission occupying additional TTIs beyond the paging transmission, and in some cases, not requiring a response in the uplink from the device.

In other words, different types of data refer to the different type of messages that applications or protocols may transmit. For example, TCP protocols may transmit "keep-alive" messages, or applications such as WhatsApp etc. may transmit status updates, etc.

The point is that there are a large number of messages created by applications and/or protocols which contain very little data.

According to some aspects, the transmission of different types or amount of data can be achieved by dividing the selected subset into further smaller subsets. Hence, different levels of subsets are available. Each of these smaller subsets differing from each other by at least the amount of data or the type of data comprised in the transmitted second data.

The proposed methods enable conveying messages of varying sizes and types via e.g. broadcast mechanisms and minimizing latency.

According to further aspects, the initiating transmission S4 may comprise transmitting the paging transmission using a paging transmission format wherein the paging transmission format comprises only a paging indicator comprising the first data or wherein the paging transmission format comprises the paging indicator comprising the first data and a pointer to one or more paging messages. Hence, the same paging message can be broadcasted by utilizing different paging formats.

In other words, a paging structure where different paging formats can be chosen depending on the current circumstances are available. Hence, the paging structure is not predefined in a fixed manner. That is, the paging structure is allowed to be dynamic.

Moreover, when utilizing different paging transmission formats, only the first data is distributed by the transmission points not in the selected subset. Hence, in the said transmission points only the data associated with the paging is comprised in the paging indicator. In the paging transmissions transmitted from the transmission points within the selected subset, the paging indicator comprises the data associated with the paging, i.e. the first data, and some additional data. In order to locate this additional data a pointer pointing to the location of this additional data is comprised in the paging indicator as well.

The paging transmission format typically defines if the paging transmission is a single transmission or if the transmission is divided into several parts. The paging transmission format typically also defines the contents of the individual parts. If the paging transmission format comprises several parts, an inherent hierarchical (forward pointer) structure of the individual parts is often defined. The paging transmission format typically also defines the mapping of message parts to physical channels.

Additionally the paging transmission format might include some L1 information e.g. coding. Within the concept of 5G it has been suggested that the paging message format may for example consist of a paging indicator field (paging indicator) allocated in a Paging Indicator Channel, PICH, indicating the targeted wireless device/s and one or several optional message field allocated in a Paging Message Channel, PMCH. Moreover the Paging Indicator Channel, PICH, field indicates whether paging is in progress and provides partial or full paging information for the wireless device. PICH may optionally be followed by a Paging Message Channel, PMCH, with additional paging or notification information.

An example is given for the scenario when the paging indicator is to be transmitted together with user data i.e. when second data is present. The step of initiating S4 transmission may then entail transmitting a paging indicator containing an identifier of the targeted wireless device, an indication that user data follows, and an attached data packet.

According to some aspects, the indicator and a pointer to the data packet are transmitted in a paging indicator field allocated in the Paging Indicator Channel, PICH, using the downlink control channel. The data packet may further be transmitted in a message field allocated in the Paging Message Channel, PMCH, in the by the pointer pointed-to resources of the downlink data channel.

Moreover, when the wireless device receives the paging transmission it decodes the signal e.g. by blindly decoding the received Paging Indicator Channel, PICH, channel contents according to one or more possible paging formats. The wireless device then determines, according to the received format, whether the page is addressed to the wireless device (i.e. whether the wireless device ID is included) and whether data (e.g. a message field allocated in the Paging Message Channel, PMCH) is attached to the paging transmission. If so, the wireless device retrieves data packet from downlink resources pointed to by the paging indicator field.

Selecting the appropriate transmission format for the given paging message allows optimizing the performance of wireless devices e.g. by enabling adaptations to link conditions and allowing for paging detection with simple receiver structure and/or low energy consumption.

According to some aspects the paging indicator comprises the second data targeting the wireless device. In other words, the non-paging related data is comprised directly in the paging indicator. This might for example be the case, when the channel quality is good and only a small amount of user data is to be transmitted to the wireless device.

According to even further aspects the one or more paging messages comprise the second data targeting the wireless device. In other words, the non-paging related data is comprised in a separate message field, pointed to by a pointer comprised in the paging indicator.

By letting the network node select an appropriate paging transmission format for a given paging message the network performance is potentially improved.

According to further aspects regarding the method, at least two of the multiple transmission points within the selected subset utilize different paging transmission formats.

Hence, the data resources may be different in the one or more most-likely-to-hear transmission points. This can for example be implemented by dividing the selected subset into further subsets, where the sub-subsets differs from each other at least by the choice of paging transmission formats.

According to some aspect, the choice of paging transmission formats depends on the channel quality between the transmission point and the wireless device.

Selecting the appropriate transmission format for the given paging transmission allows for optimizing wireless device performance e.g. by enabling adaptations to link conditions and allowing for paging detection with simple receiver structure and/or low energy consumption.

The described solution is in contrast to standard paging mechanisms where typically a single paging format is used that is a compromise between the needs of different types of messages and does not adapt to improve performance of the individual paging occasions.

Furthermore, the proposed methods provide an improved paging solution for e.g. 5G networks that are diverse in terms of supported services and wireless device types, as well as deployments and use cases.

The paging transmission format might define the paging transmission in several ways, and is not limited to the examples above. If there are several possible paging transmission formats, then there are different ways of applying them.

According to further aspects, the transmission of the paging transmission can be link-adapted. Hence, the modulation and coding parameters of the paging transmission can be configured to match previously known channel conditions. This is of particular importance for the paging transmission comprising user data.

This can for example be the case if the position of the wireless device is fairly well known and the channel parameters are also known. In this case, link-adaption can be utilized in order to make the data transmission more efficient by utilizing a modulation and coding scheme matching the known channel.

According to some aspects, the paging indicator comprises parameters describing how the paging transmission will be coded and/or modulated. Alternatively, there might be a number of predetermined modulation and coding scheme formats.

One example where link-adaption can be utilized is when the wireless device is contained within the same area for a long time and a single transmission point are identified as being a long-term best transmission point for the wireless device (i.e. the one most likely for the wireless device to be reached by). This identification may e.g. be based on repetitive consistent confirmations of reception of data included in paging, or other indications of the wireless device's presence (as previously described). The repetitive transmissions of data included in paging may also be used to estimate the channel between the transmission point and the wireless device. According to the estimated channel the Modulation and Coding Scheme, MCS, can be adapted.

In another example, data transmission via paging is not link-adapted and the Modulation and Coding Scheme, MCS, at a certain most-likely-to-hear transmission point is chosen so that a wireless device at the edge of the transmission point coverage area/s can receive the data. This might be the case when it is essential that the wireless device is able to receive the paging transmission.

In yet another example, the Modulation and Coding Scheme, MCS, is selected so that the data package (e.g. data allocated in the Paging Message Channel, PMCH) may be received in some region in the vicinity of the transmission point, but not in the entire area covered by the transmission point. This might for example be the case when data resource usage needs to be minimized. The paging transmission including second data cannot be transmitted everywhere and a gamble is performed in the sense that the wireless device might not be able to receive the transmission, but if it does, then resources has been saved.

The above description has been based on the example scenario given in FIGS. 2 and 3. The examples above are mainly directed to heterogeneous networks where the "macro" base station controls several "small" base stations. The proposed methods in a network node are then typically implemented in (or in connection with) the macro base station. In FIGS. 2 and 3 each small base station is one transmission point, which is associated with a respective coverage area also referred to as a cell.

There are several other example scenarios where the claimed subject matter can be utilized.

Alternatively, the transmission point might instead be an antenna port or an array antenna having a specific beam direction. Hence, according to some aspects an antenna beam might be referred to as a transmission point. Hence, several transmission points can be integrated in the same physical device. In one example, the method may be implemented in a network node being one base station comprising one or more antenna arrays. Then the transmission points can be considered to be different beams or sectors as described above. Hence, the proposed methods then relate to the case when user data is included in the transmission of paging data when transmitted in beam directions where it is likely that the wireless device will receive the information.

Another example, similar to the one in FIGS. 2 and 3, is where the network node is comprised in a device, e.g. base station, with enhanced intelligence and/or authority which allow it to control the paging of several other base stations. Each of these other base stations as well as the intelligent one can further comprise several transmission points, either integrated in the base stations or distributed as e.g. pico cells. The "master" network node would thus control transmission points located in several different base stations.

This might for example be the case in an office environment where one authorising base station control a base station on each floor. The base stations on each floor are further connected to several transmission points in order to cover the whole floor. Each transmission point then covers a specific area. The proposed method is executed in the authorising base station where the selection of a subset of transmission points is performed. The selection is determines which transmission points of all associated base stations that are most likely to reach the targeting wireless device with a paging. The authorising base station triggers the paging such that data targeting the wireless device is included in the paging message when transmitted from transmission points where it likely that the wireless device listens, i.e. transmission points in the subset. Furthermore, in all other transmission points, only the paging message is sent.

The network node might also be comprised further up in the network at a level where several radio accesses are controlled. Due to some aspects the network node can be implemented as cloud functionality.

As stated, the given scenarios are example scenarios and they should not been seen as limiting to the scope of protection. Moreover, when applicable, features of these scenarios are interchangeable and they can also be implemented for themselves.

Example Implementations in a Network Mode

Figure 5:
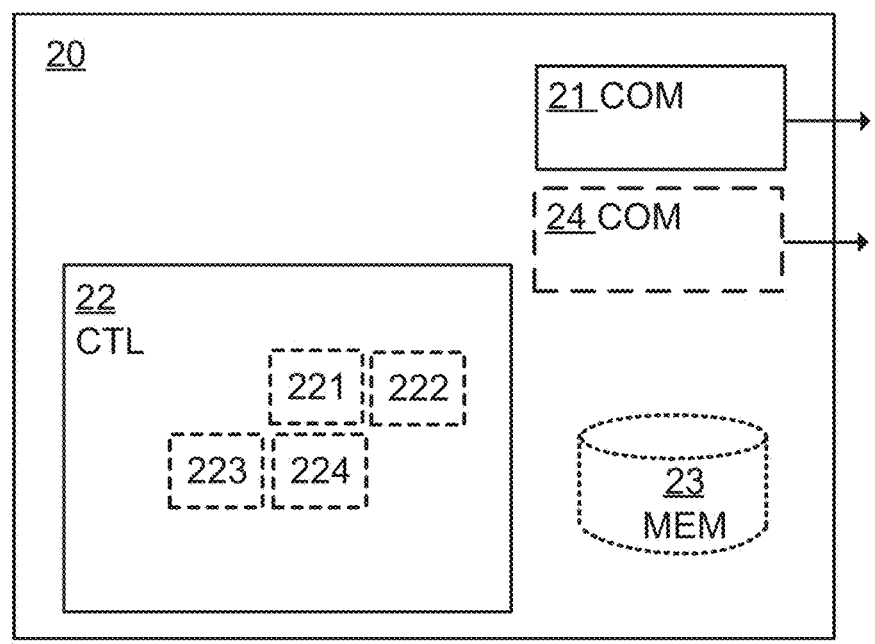
FIG. 5 is an example node configuration of a network node, according to some of the example embodiments.

Turning to FIG. 5. This figure shows a schematic diagram illustrating some modules of an example embodiment of a network node 20, in a communication system, wherein the network node 20 is configured for transmitting data to a wireless device 10. The network node is configured to execute the methods previously described. Hence, when applicable all example embodiments and aspects referred to with regard to the method also apply to the network node.

The network node 20 is for example a radio network node or base station, such as an eNodeB in LTE, providing wireless access to wireless devices within one or more areas referred to as tracking RAN areas or tracking areas in LTE.

There are several different ways of how and where the proposed functionality can be incorporated in a communication system. Hence, the herein referred network node corresponds to different nodes in the network in different aspects of the disclosure.

In one example, the network node is a base station which is associated with several tracking RAN areas wherein a mobile device can be paged. These tracking RAN areas can then further comprise several transmission points.

In another example the network node is again a base station, but now a "master" base station. It is a master in the sense that it controls (has enhanced intelligence) several other "slave" base stations. According to aspects, the master base station determines from which slave base stations and in some cases even from which transmission points associated with a specific base station that a certain paging message should be transmitted. Hence, the master base station can decide in which transmission points a paging message with included user data should be transmitted.

In yet another example a network node comprising the proposed methods is incorporated in a network at a level where several radio accesses are controlled. It can for example be seen as cloud functionality.

The network node 20 comprises a radio communication interface, i/f, 21 configured for communication with the wireless devices 10. The wireless communication interface 21 is arranged for wireless communication with other network nodes within range of the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 5, the network node 20 according to some aspects comprises a network communication interface 24. The network communication interface 24 is configured for communication with other network nodes e.g. in a core network. This communication is often wired e.g. using fiber. However, it may as well be wireless.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM, 23. The memory 23 can be any combination of a Read And write Memory, RAM, and a Read Only Memory, ROM. The memory 23 may also comprise persistent storage, which, for example, can be any single one or combination of magnetic memory, optical memory, or solid state memory or even remotely mounted memory. According to some aspects the disclosure proposes a computer program comprising computer program code which, when executed, causes a network node 20 to execute the methods above and below. According to some aspects the disclosure pertains to a computer program product or a computer readable medium holding said computer program. Thus, there is provided herein computer programs, comprising computer readable code which, when run on an apparatus, causes the apparatus to perform any of the methods disclosed herein. The computer programs of the network node display advantages corresponding to the advantages already described in relation to the respective methods disclosed above.

The processing circuitry 22 is configured to cause the network node 20 to obtain a paging area A-1, A-2, A-3 for transmitting paging data to the wireless device 10, wherein the paging area A-1, A-2, A-3 comprises multiple transmission points A-11, A-12, . . . , A-1n, A-21, A-31, A-32, . . . , A-3m. The processing circuitry 22 is further configured to select a subset Su-1 of the multiple transmission points A-1, A-2, A-3 of the paging area, based on a selection criterion. Moreover, the processing circuitry 22 is configured to initiate transmission of a paging transmission in the paging area A-1, A-2, A-3, wherein the paging transmission comprises first data and second data targeting the wireless device 10 when transmitted from the transmission points of the selected subset Su-1 of the multiple transmission points. Furthermore, the first data comprises the paging data and the second data comprises information not comprised in the first data. Moreover, the paging transmission comprises only the first data when transmitted from other transmission points of the paging area A-1, A-2, A-3. Thus, there is provided herein a network node configured for transmitting data to a wireless device. Specifically, the network node is configured to transmit paging data. The same advantages and benefits are obtained as for the corresponding features and steps of the previously discussed computer program and method, respectively.

According to further aspects the the network node 20 is a radio access node configured to transmit data from at least one of the multiple transmission points. According to even further aspects, the network node 20 is a control node configured to control, i.e., initiate, transmissions of paging data from at least one radio access node. The present disclosure thereby permits the network node to be configured in different ways providing for a more flexible communication network.

According to some aspects the transmission of the paging transmission is brought about by the existence of the second data targeting the wireless device 10.

Moreover, the network node 20 may further comprise that the processing circuitry 22 is configured to configure the paging transmission such that the paging transmission comprises the first data and the second data targeting the wireless device 10 when transmitted from the transmission points of the selected subset of the multiple transmission points. Furthermore, the processing circuitry 22 may further configured to configure the paging transmission such that the paging transmission comprises only the first data when transmitted from other transmission points of the paging area A-1, A-2, A-3.

Due to aspects regarding the first and the second data. The second data may comprise non-paging related data. Furthermore, the first data may comprise one or more wireless device identities and one or more paging indications.

Considering further aspects, the selection criterion comprises a probability associated with at least one of the multiple transmission points that the wireless device 10 will be able to receive the paging transmission transmitted from said selected subset of the multiple transmission points. The selection criterion may further comprise at least one of the following parameters: information about data transmissions to or from the wireless device 10, information about Random Access messages or Tracking RAN Area update messages received from the wireless device 10, mobility statistics, positioning prediction, wireless device capability information and/or the load of the network node 20.

According to further aspects, at least two of the multiple transmission points within the selected subset transmit paging transmissions comprise different types or amounts of the second data.

Moreover, the processing circuitry 22 may be configured to initiate transmission comprising transmitting the paging transmission using a paging transmission format wherein the paging transmission format comprises only a paging indicator comprising the first data or wherein the paging transmission format comprises the paging indicator comprising the first data and a pointer to one or more paging messages. The paging indicator may further comprise the second data targeting the wireless device 10. Moreover, regarding some aspects the one or more paging messages can comprise the second data targeting the wireless device 10. Furthermore, at least two of the multiple transmission points within the selected subset may utilize different paging transmission formats.

According to aspects it is provided for a network node, for transmitting data to a wireless device. The network node, as illustratively shown in FIG. 5, comprises modules configured to perform the methods described above. The modules are implemented in hardware or in software or in a combination thereof. The modules are according to some aspect implemented as a computer program stored in a memory 23 which is run on a processing circuitry 22.

According to some aspects the network node comprises an obtainer 221 configured to obtain a paging area for transmitting paging data to the wireless device, the paging area comprising multiple transmission points.

According to some aspects the network node comprises a selector 222 configured to select a subset of the multiple transmission points of the paging area, based on a selection criterion.

According to some aspects the network node comprises an initiator 224 configured to initiating transmission of a paging transmission in the paging area, wherein the paging transmission comprises first data and second data targeting the wireless device when transmitted from the transmission points of the selected subset of the multiple transmission points, wherein the first data comprises the paging data and the second data comprises information not comprised in the first data, and wherein the paging transmission comprises only the first data when transmitted from other transmission points of the paging area.

According to some aspects regarding the network node, the transmission of the paging transmission is brought about by the existence of the second data targeting the wireless device.

According to some aspects the network node comprises a configurator 223 configured to configure the paging transmission such that the paging transmission comprises the first data and the second data targeting the wireless device when transmitted from the transmission points of the selected subset of the multiple transmission points, and wherein the paging transmission comprises only the first data when transmitted from other transmission points of the paging area.

According to some aspects regarding the network node, the second data comprises non-paging related data.

According to some aspects regarding the network node, the first data comprises one or more wireless device identities and one or more paging indications.

According to some aspects regarding the network node, the selection criterion comprises a probability associated with at least one of the multiple transmission points that the wireless device will be able to receive the paging transmission transmitted from said selected subset of the multiple transmission points.

According to some further aspects regarding the selection criterion, the selection criterion comprises at least one of the following parameters; information about data transmissions to or from the wireless device, information about Random Access messages or Tracking RAN Area update messages received from the wireless device, mobility statistics, positioning prediction, wireless device capability information, subscription data and/or the load of the network node.

According to some aspects regarding the network node, at least two of the multiple transmission points within the selected subset transmit paging transmissions comprising different types or amounts of the second data.

According to some aspects regarding the network node, wherein the initiator 224 is configured to initiating transmission comprising transmitting the paging transmission using a paging transmission format wherein the paging transmission format comprises only a paging indicator comprising the first data or wherein the paging transmission format comprises the paging indicator comprising the first data and a pointer to one or more paging messages.

According to some further aspects regarding the initiator 224, wherein the paging indicator comprises the second data targeting the wireless device.

According to some further aspects regarding the initiator 224, wherein the one or more paging messages comprise the second data targeting the wireless device.

According to some further aspects regarding the initiator 224, wherein at least two of the multiple transmission points within the selected subset utilize different paging transmission formats.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a network node, the method comprising:
   obtaining a paging area in which paging data is to be transmitted to a wireless device, the paging area comprising multiple transmission points;
   selecting a subset of the multiple transmission points of the paging area, based on a selection criterion;
   initiating transmission of a paging transmission in the paging area, wherein the paging transmission comprises first data and second data targeting the wireless device when transmitted from the transmission points of the selected subset of the multiple transmission points, wherein the first data comprises the paging data and the second data comprises information not comprised in the first data, and wherein the paging transmission comprises only the first data when transmitted from other transmission points of the paging area.

2. The method according to claim 1, wherein the transmission of the paging transmission is brought about by the existence of the second data targeting the wireless device.

3. The method according to claim 1, further comprising:
configuring the paging transmission such that the paging transmission comprises the first data and the second data targeting the wireless device when transmitted from the transmission points of the selected subset of the multiple transmission points, and wherein the paging transmission comprises only the first data when transmitted from other transmission points of the paging area.

4. The method according to claim 1, wherein the second data comprises non-paging related data.

5. The method according to claim 1, wherein the first data comprises one or more wireless device identities and one or more paging indications.

6. The method according to claim 1, wherein the selection criterion comprises a probability associated with at least one of the multiple transmission points that the wireless device will be able to receive the paging transmission transmitted from said selected subset of the multiple transmission points.

7. The method according to claim 6, wherein the selection criterion comprises at least one of the following parameters:
information about data transmissions to or from the wireless device;
information about Random Access messages or Tracking RAN Area update messages received from the wireless device;
mobility statistics;
capability information related to the wireless device;
subscription data related to the subscription associated with the wireless device;
positioning prediction; and/or network load,
the load of the transmission point or a node connected to the transmission point or a transport network connection to/from the transmission point or the node connected to the transmission point.

8. The method according to claim 1, wherein at least two of the multiple transmission points within the selected subset transmit paging transmissions comprising different types or amounts of the second data.

9. The method according to claim 1, wherein the initiating transmission comprises transmitting the paging transmission using a paging transmission format
wherein the paging transmission format comprises only a paging indicator comprising the first data or
wherein the paging transmission format comprises the paging indicator comprising the first data and a pointer to one or more paging messages.

10. The method according to claim 9, wherein the paging indicator comprises the second data targeting the wireless device.

11. The method according to claim 9, wherein the one or more paging messages comprise the second data targeting the wireless device.

12. The method according to claim 9, wherein at least two of the multiple transmission points within the selected subset utilize different paging transmission formats.

13. A nontransitory computer readable storage medium comprising computer program code which, when executed by one or more processors, causes a network node to execute a method, the method comprising:
obtaining a paging area in which paging data is to be transmitted to a wireless device, the paging area comprising multiple transmission points;
selecting a subset of the multiple transmission points of the paging area, based on a selection criterion;
initiating transmission of a paging transmission in the paging area, wherein the paging transmission comprises first data and second data targeting the wireless device when transmitted from the transmission points of the selected subset of the multiple transmission points, wherein the first data comprises the paging data and the second data comprises information not comprised in the first data, and wherein the paging transmission comprises only the first data when transmitted from other transmission points of the paging area.

14. A network node, in a communication system, the network node comprising:
a radio communication interface configured to communicate with a wireless device; and
processing circuitry configured to cause the network node:
to obtain a paging area in which paging data is to be transmitted to a wireless device, the paging area comprising multiple transmission points;
to select a subset of the multiple transmission points of the paging area, based on a selection criterion;
to initiate transmission of a paging transmission in the paging area, wherein the paging transmission comprises first data and second data targeting the wireless device when transmitted from the transmission points of the selected subset of the multiple transmission points, wherein the first data comprises the paging data and the second data comprises information not comprised in the first data, and wherein the paging transmission comprises only the first data when transmitted from other transmission points of the paging area.

15. The network node according to claim 14, wherein the network node is a radio access node configured to transmit data from at least one of the multiple transmission points.

16. The network node according to claim 14, wherein the network node is a control node configured to control transmissions of paging data from at least one radio access node.

17. The network node according to claim 14, wherein the transmission of the paging transmission is brought about by the existence of the second data targeting the wireless device.

18. The network node according to claim 14, further comprising:
the processing circuitry is configured to configure the paging transmission such that the paging transmission comprises the first data and the second data targeting the wireless device when transmitted from the transmission points of the selected subset of the multiple transmission points, and wherein the paging transmission comprises only the first data when transmitted from other transmission points of the paging area.

19. The network node according to claim 14, wherein the second data comprises non-paging related data.

20. The network node according to claim 14, wherein the first data comprises one or more wireless device identities and one or more paging indications.

21. The network node according to claim 14, wherein the selection criterion comprises a probability associated with at least one of the multiple transmission points that the wireless device will be able to receive the paging transmission transmitted from said selected subset of the multiple transmission points.

22. The network node according to claim 21, wherein the selection criterion comprises at least one of the following parameters:

information about data transmissions to or from the wireless device;
information about Random Access messages or Tracking RAN Area update messages received from the wireless device;
mobility statistics;
positioning prediction;
wireless device capability information;
subscription data; and/or the load of the network node.

23. The network node according to claim 14, wherein at least two of the multiple transmission points within the selected subset transmit paging transmissions comprising different types or amounts of the second data.

24. The network node according to claim 14, wherein the processing circuitry is configured to initiate transmission comprising transmitting the paging transmission using a paging transmission format
  wherein the paging transmission format comprises only a paging indicator comprising the first data or
  wherein the paging transmission format comprises the paging indicator comprising the first data and a pointer to one or more paging messages.

25. The network node according to claim 24, wherein the paging indicator comprises the second data targeting the wireless device.

26. The network node according to claim 24, wherein the one or more paging messages comprise the second data targeting the wireless device.

27. The network node according to claim 24, wherein at least two of the multiple transmission points within the selected subset utilize different paging transmission formats.

* * * * *